(12) United States Patent
Ashley et al.

(10) Patent No.: US 9,729,642 B2
(45) Date of Patent: Aug. 8, 2017

(54) SHARING WEB APPLICATION SESSIONS ACROSS MULTIPLE DEVICES

(71) Applicant: International Business Machines Corporation, Armonk, NY (US)

(72) Inventors: Paul A. Ashley, Toowong (AU); Christopher Y. Choi, Southport (AU); John W. Court, Carrara (AU); Simon W. Gee, Varsity Lakes (AU)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 13/901,984

(22) Filed: May 24, 2013

(65) Prior Publication Data

US 2014/0351370 A1 Nov. 27, 2014

(51) Int. Cl.
*H04L 29/08* (2006.01)

(52) U.S. Cl.
CPC .................................. *H04L 67/148* (2013.01)

(58) Field of Classification Search
None
See application file for complete search history.

(56) References Cited

U.S. PATENT DOCUMENTS

| 7,526,559 B1 | 4/2009 | Phillips | |
| 8,843,750 B1 * | 9/2014 | Sokolov | H04L 9/0825 713/175 |
| 2005/0033843 A1 | 2/2005 | Shahi et al. | |

(Continued)

FOREIGN PATENT DOCUMENTS

| WO | 2011156155 A2 | 12/2011 |
| WO | 2011156170 A2 | 12/2011 |

OTHER PUBLICATIONS

Phan et al. "Handoff of Application Sessions Across Time and Space", <http://www.google.co.in/url?sa=t&rct=j&q=&esrc=s&source=web&cd=1&ved=0CCAQFjAA&url=http%3A%2F%2Fciteseerx.ist.psu.edu%2Fviewdoc%2Fdownload%3Fdoi%3D10.1.1.28.3355%26rep%3Drep1%26type%3Dpdf&ei=4XJoUMHMHsjKrAf9tYHICA&usg=AFQjCNF5gl3nkrhlW7cQ23fJmRAK7STcuw>, downloaded on Feb. 28, 2013.

(Continued)

*Primary Examiner* — Kevin Bates
*Assistant Examiner* — Lesa Kennedy
(74) *Attorney, Agent, or Firm* — Edward J. Wixted, III

(57) ABSTRACT

A technique to at least partial transfer an active network communication session associated with a server and an authenticated user communicating through a first device. The at least partial transfer includes the following actions (not necessarily in the following order): (i) recording the network communication session on an inline network device; (ii) associating the network communication session with the second device on the inline network device; and (iii) sending session continuation information from the inline network device to at least the second device and/or the server. The first device is in data communication with the inline network device during at least a portion of the recording step. The session continuation information sent at the sending step includes information enabling the user to continue the active network communication session through the second device. The inline network device performs at least the associating step and the sending step under control of computer software running on computer hardware.

17 Claims, 3 Drawing Sheets

(56) References Cited

U.S. PATENT DOCUMENTS

| | | | |
|---|---|---|---|
| 2006/0101520 A1* | 5/2006 | Schumaker | G06F 21/554 726/25 |
| 2006/0146767 A1 | 7/2006 | Moganti | |
| 2007/0192495 A1* | 8/2007 | Marais | G06F 9/546 709/227 |
| 2009/0055542 A1* | 2/2009 | Zhao | H04L 29/06 709/228 |
| 2009/0055912 A1* | 2/2009 | Choi | G06F 21/41 726/6 |
| 2009/0063690 A1 | 3/2009 | Verthein et al. | |
| 2011/0055627 A1 | 3/2011 | Zawacki et al. | |
| 2012/0096076 A1 | 4/2012 | Chan | |
| 2013/0117821 A1* | 5/2013 | Tock | G06F 21/33 726/4 |
| 2014/0259147 A1* | 9/2014 | L'Heureux | H04L 63/02 726/14 |

OTHER PUBLICATIONS

"Chrome Web Store—FreshStart—Cross Browser Session Manager", <https://chrome.google.com/webstore/detail/freshstart-cross-browser/nmidkjogcjnnlfimjcedenagjfacpobb#detail/nmidkjogcjnnlfimjcedenagjfacpobb>, downloaded on Feb. 28, 2013.

"Ensuring Session Continuity for Mobile Workers—Citrix eDocs", <http://support.citrix.com/proddocs/topic/xenapp6-w2k8-admin/ps-sessions-prov-usrs-ws-cont-v2.html>, downloaded on Feb. 28, 2013.

* cited by examiner

SHARING WEB APPLICATION SESSIONS ACROSS MULTIPLE DEVICES

FIELD OF THE INVENTION

The present invention relates generally to the field of web application sharing sessions, and more particularly to sharing web application sessions across multiple devices.

BACKGROUND OF THE INVENTION

Increasingly, in work and/or personal use contexts, human users want to use multiple computers, including computers of various types, such as smart phones, tablets, laptops and desktop personal computers (PCs). This often leads to situations where a user (see Definitions sub-section of the DETAILED DESCRIPTION section, below) needs to switch quickly to a different device in the middle of using a set of web applications. When a user switches to a different device, her active sessions are typically lost and the user is required to: (i) log in to the applications again; and (ii) recreate any data from the previous session that was lost in the device switch. This causes lost productivity and creates a pattern of behavior where a user only performs a limited set of business functions while on an alternate device. Additionally, the problems of switching devices in the conventional way can inhibit a user from wanting to change devices due to the inconvenience and/or data loss.

There are known software products that allow a user to synchronize files, applications and application configurations across multiple devices, but this is not the same thing as transferring an active application session. There is a browser extension that allows a session state to be saved to a file and manually transferred to another device, but this is potentially burdensome and only works for a specific browser.

SUMMARY

According to an aspect of the present invention, there is a process for at least partial transfer of an active network communication session associated with a server and an authenticated user communicating through a first device. The process includes the following steps (not necessarily in the following order): (i) recording the network communication session on an inline network device; (ii) associating the network communication session with the second device on the inline network device; and (iii) sending session continuation information from the inline network device to at least one of the following: the second device and the server. The first device is in data communication with the inline network device during at least a portion of the recording step. The session continuation information sent at the sending step includes information enabling the user to continue the active network communication session through the second device. The inline network device performs at least the associating step and the sending step under control of computer software running on computer hardware.

According to a further aspect of the present invention, there is an inline network device for effecting at least partial transfer of an active network communication session associated with a server and a user who can communicate through a first device and a second device. The inline network device includes: (i) a recording module structured, connected and programmed to record the network communication session when the first device is active; (ii) an associated device module structured, connected and programmed to associate the network communication session with the second device subsequent to recording by the recording module; and (iii) a session continuation information module structured, connected and programmed to send session continuation information to at least the second device and/or the server. The session continuation information sent by the session continuation module includes information enabling the user to continue the active network communication session through the second device.

DETAILED DESCRIPTION

Some embodiments of the present invention enable a user to easily switch from a first computer to a second computer without losing any web application progress that the user made in a web application session that is in progress on and over the first device. This allows the user to: (i) quickly swap from one device to another; and (ii) continue any application work that the user had underway. This provides a benefit to both the user and to any business for which the user may have been working.

Some embodiments of the present invention allow a user to securely transfer an active session of a web application by a method including the following steps: (i) the user authenticates to an inline network device (which may already exist in the IT (information technology) infrastructure) from their first computer (computer A); (ii) the inline network device records current authenticated user sessions based on service or service type accessed; (iii) the user authenticates to the inline network device from their second computer (computer B); (iv) the user requests access to service or service type from computer B; (v) the inline network device locates the user session for the requested service; (vi) the inline network device associates the user session with computer B; (vii) the inline network device sends the saved session to computer B; and (viii) the user resumes the web application session on computer B.

Some embodiments of the present invention may provide one or more of the following advantages:

(i) secure transfer of a web application session between computers (as contrasted with a mere transfer of files and application configuration);

(ii) does not require additional software or configuration on the client computers;

(iii) does not require a specific browser;

(iv) does not require any user interaction to save and transfer sessions; and/or (v) provides centralized management of the user sessions across multiple applications and devices.

Figure 1:
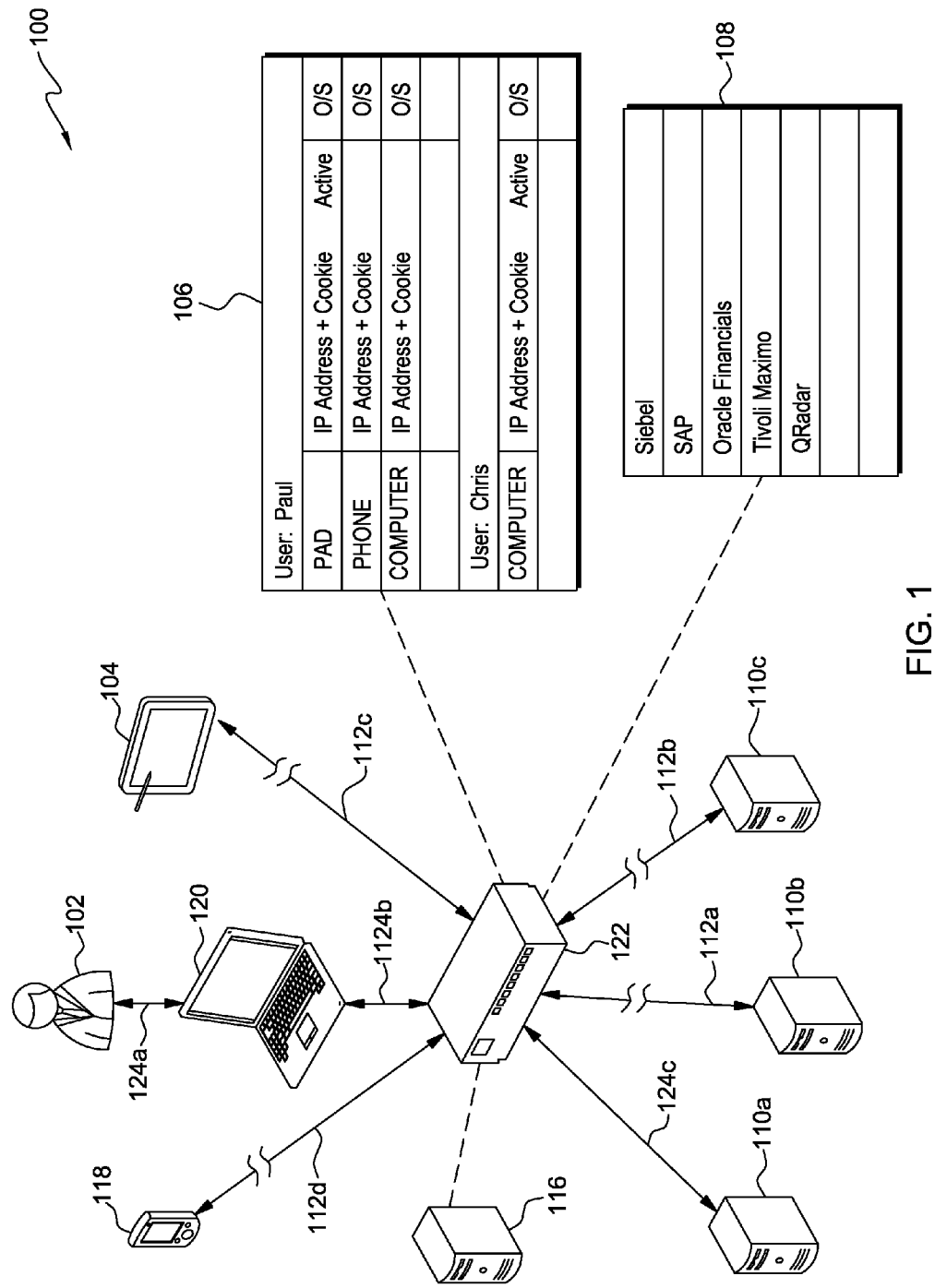
FIG. 1 is a schematic view of a first embodiment of a computer system (that is, a system including one or more processing devices) according to the present invention.

FIG. 1 shows computer system 100, including: user 102 (see Definitions, below); tablet 104; asset list 106; enterprise web applications (apps) list 108; enterprise web app servers 110; inactive local area network (LAN) communication paths 112a,b,c,d; enterprise directory server 116; smart phone 118; laptop 120; inline network device 122; and active LAN communication paths (see Definition of "data communication," below) 124*a,b,c*. Enterprise web app servers include: web app A server 110*a*; web app B server 110*b*; and web app C server 110*c*. In this embodiment, the inline network device connects, in data communication through a LAN. Alternatively, these data communication connections could be made in ways other than through a LAN.

User 102 has multiple devices including smart phone 118, laptop 120 and tablet 104. User 102 wants to be able to change from one device to another and continue her work through the change with as little disruption as possible. Inline network device 122 connects whichever device 118, 120, 104 that the user is currently using to whichever enterprise web application(s) are currently active. More specifically, as shown in FIG. 1, user 102 is currently using laptop 120 to access and use app A hosted on web app A server 110*a*. In this embodiment, web app A server 110*a* is remote from user 102, laptop 120 and inline network device 122. Web apps A, B and C (hosted respectively on web app servers 110*a*, 110*b* and 110*c*) are applications that user A requires to perform her job role. In this embodiment, these enterprise web applications are within the enterprise environment. Alternatively, they could be in a remote cloud environment.

The operation of inline network device will now be discussed. List of the enterprise web applications 108 is available to inline network device 122 from enterprise directory server 116 as shown by the dotted lines in FIG. 1. Asset list 106 is also available to inline network device 122. Access list 106 includes a sub-list for each user, and each sub-list lists the user's associated devices and device identification information (for example, MAC address, operating system of the device). Enterprise directory server 116 is used to authenticate user 102. This authentication may take one or more of the following forms: (i) active (challenge the user); and/or (ii) passive (through the enterprise directory server already having authenticated the user). In this embodiment inline network device 122 is a next generation intrusion prevention system (NGIPS) or similar product. As is known by those of skill in the art, these products provide application identification and active/passive authentication of users.

An example of one use of system 100 will now be discussed. User 102 (also called Chris) authenticates to inline network device 122 either actively or passively. Inline network device 122 uses enterprise directory server 116 for authentication. Inline network device 116 associates Chris's laptop's client IP address with her user ID and a device identifying cookie. At her desk, the user (Chris) accesses web application A via her laptop 120. Inline network device 122 validates the laptop as a registered device for Chris against asset list 106 (in Asset Management or Identity Management System). Chris logs onto web application A. Inline network device creates records of: (i) Chris's identification, or ID, (for example, her user name); (ii) device ID (IP address plus device identifying cookie); and (iii) the current set of application cookies (from HTTP header) for the enterprise web app list 108. While Chris continues to use web application A, inline network device 122 will monitor the traffic for any update to the application session. In order to monitor for such an update, inline network device monitors for presence of a SET_COOKIE header, and, when such a header is present, updates its record of the session.

Sometime later, while still working with the web application, Chris has to attend a lab meeting so she picks up her smart phone 118 and leaves her desk to attend the meeting. During the meeting, Chris attempts to access web application A from her smart phone. Chris authenticates to inline network device 122. This again may be through active or passive authentication. Inline network device 122: (i) authenticates Chris against information in enterprise directory server 116; (ii) validates smart phone 118 registered device for Chris against asset list 106; (iii) locates Chris's existing session for web application A; (iv) notifies Chris that an existing session is found for web application A; and (v) asks Chris, through smart phone 118, whether or not Chris would like to continue the existing session previously started through laptop 120. In response to step (v), Chris provides user input, through her smart phone 118, to indicate to inline network device that she would indeed like to continue the existing session.

In response, inline network device 122 marks Chris's smart phone 118 as the new owner for the application session. This prevents a malicious user (not shown) from using Chris's laptop 120, while she is away from the laptop, in order to hijack her session. Inline network device 122 sends a SET_COOKIE header to Chris's smart phone and redirects its browser (not separately shown) to the original URL. Alternatively, some embodiments may not use SET_COOKIE. However, in the embodiment now under discussion setting the cookie in the browser means that the inline device does not have to look up and populate cookies for every request. Chris is now back at where she left off with her work on web app A, with minimal disruption in terms of both time and effort.

Figures 2, 3:
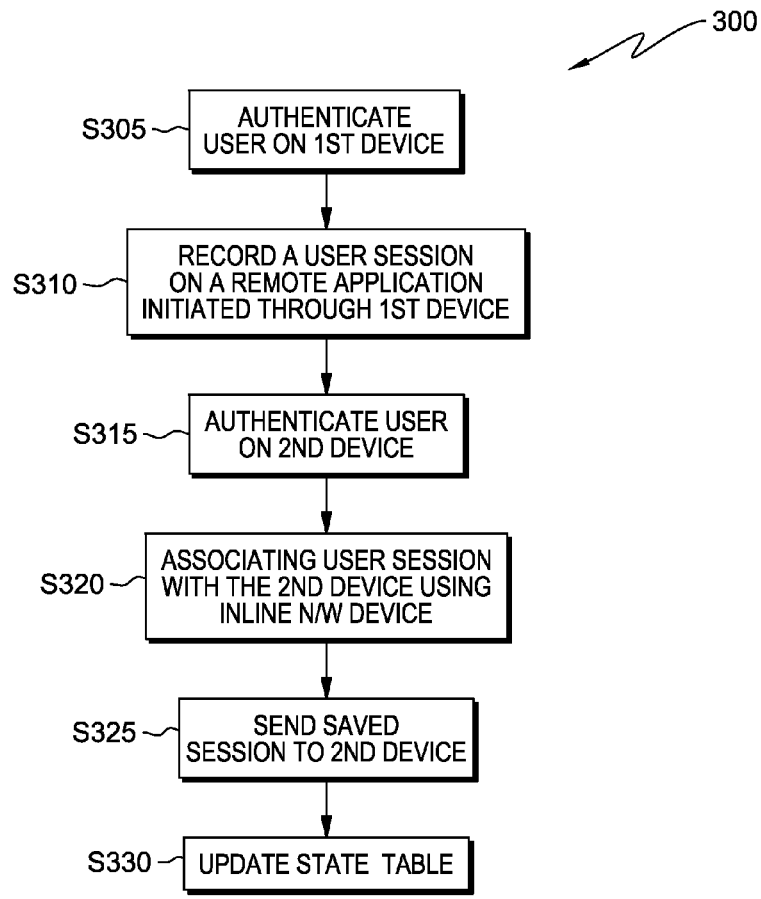
FIG. 2 is a table generated by the first embodiment computer system.
FIG. 3 is a flowchart showing a process performed, at least in part, by the first embodiment computer system.

A shown in FIG. 2, state table 200 keeps the state of system 100. State table 200 is information maintained in inline network device 122 to manage each user, each user's current associated device and the application state.

Manual session recording by system 100 will now be discussed. In certain situations, there might be performance issues with having to record the application sessions for all users all of the time. If this is the case, then the system may be designed so that a user manually initiates each session transfer, for example by navigating to a specific URL. Only when this happens will the inline device record the session's state information.

SSL (secure sockets layer) inspection will now be discussed. The retention of artifacts required for the preservation and transition of application state requires full access to all session construction data. In the case of an encrypted connection, access to the data is gated on being able to access this encrypted connection.

In the embodiment of system 100, inline network device 122 is required to perform access of the secure connection to gain access to session cookies and enhanced application identification data. As an intermediary device, inline network device 122 is able to provide management of the secure connection through "man-in-the-middle" techniques that allow it full access to the required web application data.

A typical sequence that might be used by the inline network device is as follows: (i) the user's client initiates a session connection to the web application server; (ii) inline network device detects the user's client session request and intercepts it; (iii) the inline network device initiates a session connection to the web application server; (iv) the web application server responds with its SSL certificate; (v) the inline network device parses the web application server certificate and generates a duplicate with modification to details relevant to its own specifics (such as certificate signature, subject public key info and issuer); and (vi) the inline network device sends the modified certificate to the user's client. At this point, if the user's client accepts the modified certificate, the inline network device has the ability to perform further analysis on the session for the purpose of web application identification and session retention.

Device registration will now be discussed. The inline device will set a persistent cookie in each device as part of the initial registration process. Using this approach, each time a registered device is redirected to login to the inline device, the identifying cookie will be automatically sent by the browser. To mitigate the possibility of replay, standard one time pad mechanisms can be used to cycle the device identifying cookie on each login.

In some embodiments of the present invention, the system works on incoming and outgoing processing requests, as opposed to exclusively processing requests coming into the corporate network. These embodiments use an inline device that is located and connected in data communication to inspect all traffic. If it were only required to consider processing requests coming into the corporate network, the browsers would be pointed directly to a single point of contact. However, in embodiments that consider traffic outgoing from the corporate network, the browsers generally cannot be pointed to a single point of contact. For example, organizations are increasingly relying on cloud services, and it is generally not feasible to create a single logical connection to the cloud and then force users to proxy through this single point of contact.

In some embodiments, the use of an inline device allows the system to set the application cookies back on the client, because the system works in a truly transparent way. In this way, the application cookies can be continually used even if the device switches network on subsequent requests. These embodiments do not require the traffic to route through a single point of contact.

A potentially advantageous feature of some embodiments of the present invention is the information maintained about the various devices that each authentic user may choose to use (see FIG. 1 at asset list 106). This feature is potentially advantageous because: (i) it facilitates restrictions on session sharing based on whether or not a device is sufficiently secure; and (ii) it ensures that a user will only share a session between and among devices that are known to belong to her. At least some embodiments of the present invention are "device-centric," which can potentially alleviate concerns about device security in a "bring your own device" environment.

Some embodiments of the present invention may have one or more of the following features, characteristics and/or advantages: (i) use a persistent cookie to recognize registered and authenticated devices; (ii) have and/or require no client software and no library; (iii) a user's devices will not be able to directly communicate with each other so that the inline device leverages as a proxy for transferring the sessions; (iv) leverages an inline device and as such does not require additional software to be installed on the target system and will work for any web application hosted anywhere; (v) does not require any changes to the existing applications; (vi) does not require the client device or client software to be modified; (vii) transfers web sessions; (viii) transfers application sessions for cloud-based applications.

Figure 4:
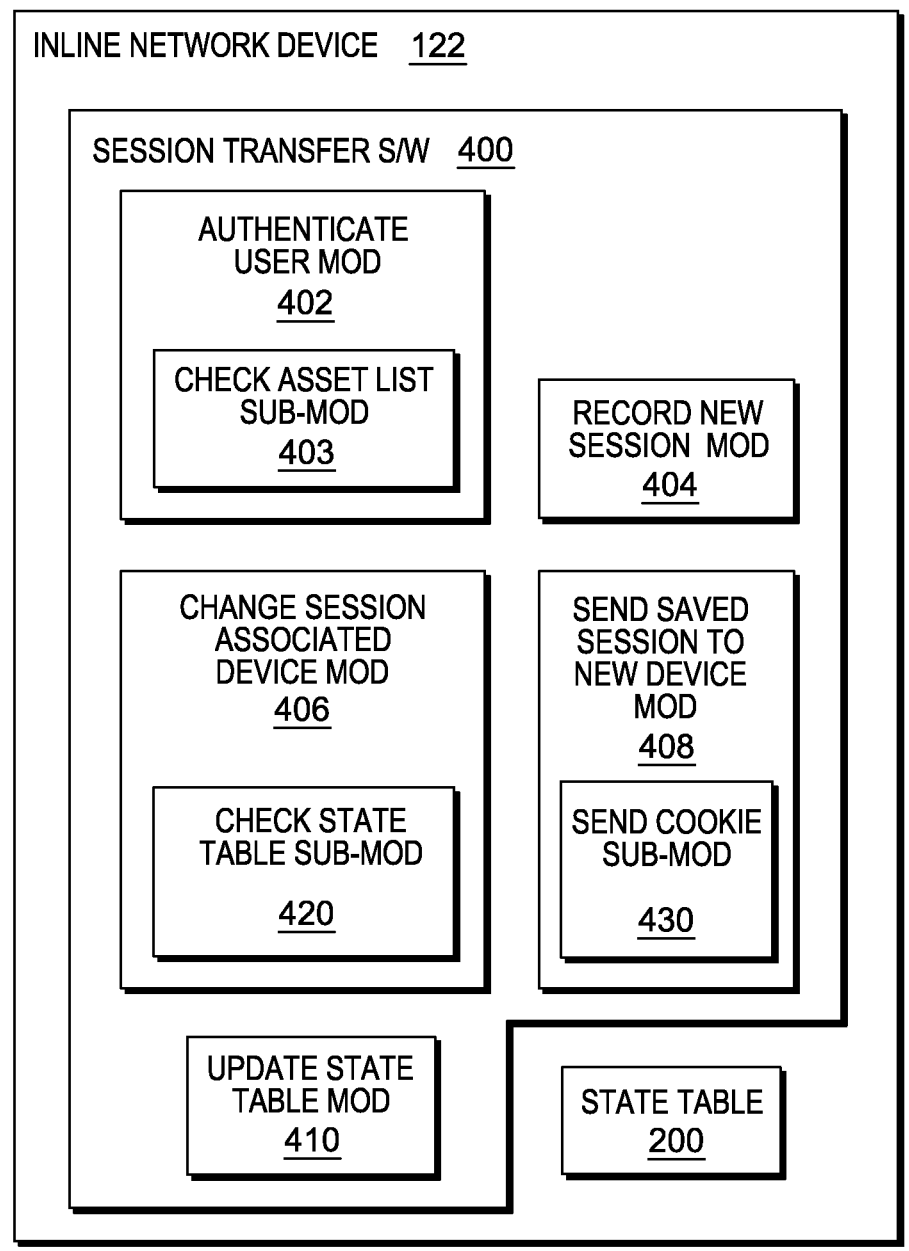
FIG. 4 is a schematic view of a portion of the first embodiment computer system.

FIG. 3 shows a flow chart of process 300 according to an embodiment of the present invention, and FIG. 4 shows software, stored and running within inline network device 122, for performing at least a portion of process 300. The process and associated software will now be discussed in the following paragraphs with references to FIG. 3 (for the process step blocks) and FIG. 4 (for the software components).

Processing begins at step S305 where authenticate user module (mod) 402 authenticates a user on the user's first device (laptop 120, see FIG. 1, in this example). The authentication may be any type of authentication now known or to be developed in the future. As part of this authentication in this embodiment, check asset list sub-mod 403 of the authenticate user mod checks asset list 106 (see FIG. 1) to determine if the user is using one of the assets that is known to belong to him (or to have been entrusted to him by his employer). If the user is trying to use an asset other than what is on his list in asset list 106, then the software will not authenticate him, but will instruct him as to the steps to take to get the device registered with the asset list.

Processing proceeds to step S310 where record new session mod 404 records an active network communication session, of the first user and being conducted through the first device.

Processing proceeds to step S315 where authenticate user mod 402 authenticates the user through a second device. In this example, the second device is smart phone 118 (see FIG. 1). As part of this authentication in this embodiment, check asset list sub-mod 403 of the authenticate user mod checks asset list 106 (see FIG. 1) to determine if the user is using one of the assets that is known to belong to him (or to have been entrusted to him by his employer).

Processing proceeds to step S320 where change session associated device mod 406 associates the active network communication session with the second device (in this example, smart phone 118). In order to make this new association, check state table sub-mod 420 of change session associated device mod checks state table 200 (see FIGS. 2 and 3) to locate the active session for the purpose of changing the device association from the first device to the second device.

Processing proceeds to step S325 where session continuation information corresponding to the saved network communication session is sent to any and all destination(s) so that the session can be continued by the user on (at least) the second device. This continuation information is collected and sent by send saved session to new device mod 408. In most, if not all, embodiments, at least a portion of the session continuation information is sent to the second device, where the network communication session will be continued by the user. In some embodiments, session continuation information may be sent to additional destination(s) such as the first device and/or a web server hosting the network communication session (see FIG. 1 at web server 110b). If the session continuation information is sent to multiple devices, then each destination may receive a different portion of the session continuation information. For example, the first device may merely receive information indicating that the session will be transferred away from it, and may not get information that the second device receives, which enables the second device to continue the network communication session.

In some embodiments, the active network communication session may only be allowed to be held with one of the user's devices at a time. Alternatively, some embodiments may allow multiple user devices to simultaneously participate in the same active network communication session. In these alternative embodiments, the session continuation information would add the second device, rather than replacing the first device with the second.

In this embodiment, at step S325 send cookie sub-mod 430 of the send saved session to new device mod sends a cookie (of any form and format now known or to be developed in the future) to the second device for security and/or reliability purposes.

Processing proceeds to step S330 where update state table mod 410 updates state table 200 in order to indicate that the active network session has been changed from the first device to the second device.

Some definitions will now be set forth in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

What is claimed is:

1. A process for at least partial transfer of an active network communication session associated with a server and an authenticated user communicating through a first device, the process comprising:
    recording a network communication session on an inline network device, wherein the network communication session includes a user input, from a first device, on a web application;
    associating the network communication session with a second device on the inline network device, by, at least, associating an IP address of the second device with a user ID and a device identifying cookie, subsequent to recording;
    authenticating the second device, based, at least in part, on an asset list, wherein:
        the asset list comprises one or more devices registered to an authenticated user;
        the asset list includes an operating system of each of the one or more devices; and
        the one or more devices comprises the first device and the second device;
    sending, from the inline network device to the first device, an indication that the active network communication session is transferring away from the first device;
    sending session continuation information from the inline network device to the one or more devices of the asset list; and
    populating, in response to the second device authentication, a web application on the second device with the user input from the network communication session on the first device;
    wherein:
        the first device is registered to the authenticated user;
        the first device is in data communication with the inline network device during at least a portion of the recording step;
        the session continuation information sent at the sending step includes information enabling the user to continue the active network communication session through the second device;
        the inline network device performs at least the associating step and the sending step under control of computer software running on computer hardware; and
        the inline network device is structured, connected and/or located to connect, in data communication through a local area network, with the first device and the second device.

2. The process of claim 1 further comprising the following:
    marking, by the inline network device, the second device as an exclusive owner of the network communication session.

3. The process of claim 1 wherein:
    at least a second device portion of the session continuation information is sent to the second device; and
    the second device portion of the session continuation information includes a SET_COOKIE header.

4. The process of claim 1 wherein:
    at least a second device portion of the session continuation information is sent to the second device; and
    the second device portion of the session continuation information includes instructions to redirect a browser to an original URL.

5. The process of claim 1 further comprising:
    authenticating, by the inline network device, the second device.

6. The process of claim 1 wherein the inline network device is a middleware device.

7. The process of claim 1 further comprising:
    connecting, in data communication through a local area network, the first device and the inline network device; and
    connecting, in data communication through the local area network, the second device and the inline network device.

8. An inline network device for effecting at least partial transfer of an active network communication session associated with a server and a user who can communicate through a first device and a second device, the inline network device comprising:
    a recording module structured, connected and programmed to record a network communication session when a first device is active, wherein the network communication session includes a user input, from the first device, on a web application;

an associated device module structured, connected and programmed to associate the network communication session with a second device, by, at least, associating an IP address of the second device with a user ID and a device identifying cookie, subsequent to recording by the recording module;

an authentication module, structured, connected and programmed to authenticate the second device, based, at least in part, on an asset list, wherein:
the asset list comprises one or more devices registered to an authenticated user;
the asset list includes an operating system of each of the one or more devices; and
the one or more devices comprises the first device and the second device;

a session continuation information module structured, connected and programmed to send session continuation information to the one or more devices of the asset list and send, from the inline network device to the first device, an indication that the active network communication session is transferring away from the first device; and a population module, structured, connected and programmed to populate, in response to the second device authentication, a web application on the second device with the user input from the network communication session on the first device;

wherein:
the inline network device is structured, connected and/or located to connect, in data communication through a local area network, with the first device and the second device; and
the session continuation information sent by the session continuation module includes information enabling the user to continue the active network communication session through the second device.

9. The inline network device of claim 8 further comprising the following:
a marking module connected, programmed and structured to mark the second device as exclusive owner of the network communication session when the second device is associated by the associated device module.

10. The inline network device of claim 8 wherein:
the session continuation information module is further structured, programmed and/or connected to send at least a second device portion of the session continuation information to the second device; and
the second device portion of the session continuation information includes a SET_COOKIE header.

11. The inline network device of claim 8 wherein:
the session continuation information module is further structured, programmed and/or connected to send at least a second device portion of the session continuation information to the second device; and
the second device portion of the session continuation information includes instructions to redirect a browser to an original URL.

12. The inline network device of claim 8 further comprising:
an authenticate user module structured, programmed and/or connected to authenticate the first device and the second device.

13. The inline network device of claim 8 wherein the inline network device is a middleware device.

14. The process of claim 1 wherein the asset list includes operating system of the device.

15. The process of claim 1 wherein associating the network communication session with the second device on the inline network device comprises:
associating an IP address of the second device with a user ID and a device identifying cookie.

16. The process of claim 1 further comprising:
maintaining, by the inline network device, a state table, wherein the state table includes the user, an active device of the user, and an application state.

17. The process of claim 1 further comprising:
detecting, by the inline network device, a request for a session connection to the web application;
intercepting, by the inline network device, the request;
initiating, by the inline network device, the session connection to the web application;
receiving, by the inline network device, a first SSL certificate of the web application;
generating, by the inline network device, a second SSL certificate, wherein the second SSL certificate modifies the first SSL certificate; and
sending, by the inline network device, the second SSL certificate to the first device.

* * * * *